(12) United States Patent
Lee et al.

(10) Patent No.: US 7,748,485 B2
(45) Date of Patent: Jul. 6, 2010

(54) UPPER FRAME FOR CONSTRUCTION EQUIPMENT

(75) Inventors: Jin Woo Lee, Kimhae (KR); Jai Wook Shin, Changwon (KR); Kyoung Cheol Hong, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 12/389,395

(22) Filed: Feb. 20, 2009

(65) Prior Publication Data

US 2009/0211833 A1 Aug. 27, 2009

(30) Foreign Application Priority Data

Feb. 27, 2008 (KR) ...................... 10-2008-0017908

(51) Int. Cl.
*B62D 23/00* (2006.01)
(52) U.S. Cl. .................. 180/89.1; 180/900; 37/347; 414/686; 414/687; 212/227; 212/231
(58) Field of Classification Search ................. 280/781; 180/89.11, 89.12, 89.13, 311, 312, 327; 414/686, 414/687; 212/223, 227, 231, 232, 237
See application file for complete search history.

(56) References Cited

U.S. PATENT DOCUMENTS 2,458,271 A * 1/1949 Huston ....................... 212/172
5,353,940 A * 10/1994 Pech et al. ................... 212/180
6,499,556 B1 * 12/2002 Koyama ...................... 180/311
6,648,582 B2 * 11/2003 Mayer et al. ................. 414/694
7,086,547 B2 * 8/2006 Hanamoto ................... 212/175
7,426,796 B2 * 9/2008 Cunningham et al. ......... 37/468
7,481,168 B2 * 1/2009 Pike et al. ....................... 104/9
7,481,289 B2 * 1/2009 Ueda et al. ............... 180/89.16

* cited by examiner

*Primary Examiner*—Toan C To
(74) *Attorney, Agent, or Firm*—Ladas and Parry LLP

(57) ABSTRACT

An upper frame for construction equipment mounted to swing on a lower driving structure is provided, in which fixing pins for supporting a boom and a boom cylinder are coupled to left and right side plates that are welded on a base plate to face each other, and a plate-shaped joint connection plate is welded on the left and right side plates and the base plate, so as to support the left and right side plates by exhibiting the rigidity and flexibility against load being transferred to the fixing pins through a working device during working. The upper frame includes a base plate on which a driving means for swing the upper frame is mounted, left and right side plates vertically welded on the base plate to face each other and composed of inner and outer vertical plates to which a boom and a boom cylinder are rotatably fixed by fixing pins, respectively, and a joint connection plate having both sides welded on inner sides of the inner vertical plates and a lower end part welded on the base plate and supporting the left and right side plates by exhibiting rigidity and flexibility when reaction load from the boom is generated on the fixing pins due to load generated on the working device during working.

6 Claims, 9 Drawing Sheets

UPPER FRAME FOR CONSTRUCTION EQUIPMENT

CROSS-REFERENCE TO RELATED APPLICATION

This application is based on and claims priority from Korean Patent Application No. 10-2008-0017908, filed on Feb. 27, 2008 in the Korean Intellectual Property Office, the disclosure of which is incorporated herein in its entirety by reference.

BACKGROUND OF THE INVENTION

1. Field of the Invention

The present invention relates to an upper frame for construction equipment mounted to swing on a lower driving structure, which is composed of left and right side plates welded on a base plate to face each other, and a plate-shaped joint connection plate welded on the left and right side plates and the base plate.

More particularly, the present invention relates to an upper frame for construction equipment mounted to swing on a lower driving structure, in which fixing pins for supporting a boom and a boom cylinder are coupled to left and right side plates that are welded on a base plate to face each other, and a plate-shaped joint connection plate is welded on the left and right side plates and the base plate (i.e. three sides of the joint connection plate are welded), so as to support the left and right side plates by exhibiting the rigidity and flexibility against load being transferred to the fixing pins through a working device during working.

2. Description of the Prior Art

As illustrated in FIG. 1, a general tracked excavator includes a lower driving structure 1; an upper frame 2 mounted to swing on the lower driving structure 1; a cab 3 and an engine room 4 mounted in front and in the rear of the upper frame 2; a working device 11 composed of a boom 5, an arm 6, and a bucket 7 connected to the upper frame 2 and hydraulic cylinders 8, 9, and 10 driving the boom, the arm, and the bucket, respectively; and a counter weight 12 mounted in the rear of the upper frame 2 to maintain a balance of the equipment during operation.

As illustrated in FIGS. 2 to 4B, a conventional upper frame of the construction equipment includes a base plate 13 on which a swing ring gear, a swing motor, and the like, are mounted to swing the upper frame 2; left and right side plates 14 and 15 (which include inner vertical plates 14a and 15a and outer vertical plates 14b and 15b) vertically welded on the base plate 13 to face each other; fixing pins 16 and 17 fixed to upper end parts of the side plates 14 and 15 to rotatably support a boom 5; fixing pins 18 and 19 fixed to lower end parts of the side plates 14 and 15 to rotatably support a boom cylinder 8; a cylindrical upper connection member 20 having both end parts welded on inner sides of the inner vertical plates 14 and 15 to joint-connect and support the upper end parts of the side plates 14 and 15; and an angle-shaped lower connection member 21 having three sides welded on the inner sides of the inner vertical plates 14a and 15a and the base plate 13 to support the inner vertical plates 14a and 15a and the base plate 13.

According to the conventional upper frame of the construction equipment, in order to effectively distribute and support large load acting on the boom 5 during working and to reduce the weight of the boom 5, the boom 5 is rotatably fixed to the side plates 14 and 15 using the fixing pins 16 and 17.

In order to secure a safe rigidity against load being transferred from a working device during working, the upper end parts of the side plates 14 and 15 are connected together and supported by the upper connection member 20, and the lower end parts of the side plates 14 and 15 are welded on the lower connection member 21 and the base plate 13, respectively.

As illustrated in FIGS. 2 and 3, in the case where the upper connection member 20 is welded between the side plates 14 and 15 in the conventional upper frame of the construction equipment, the posture of a worker, who performs welding work along the shape of the upper connection member 20 having a cylindrical cross section, becomes unstable. Accordingly, it is difficult to secure the quality of the welded part of the upper connection member 20 against the side plates 14 and 15.

Also, in the case of developing a new model of the construction equipment, power acting on the working device may be increased to improve the operation efficiency of the construction equipment in accordance with a user's demand. In this case, it is required to increase the thickness of the side plates 14 and 15 and the dimensions (e.g. size and thickness) of the upper connection member 20 to cope with the increased power of the working device.

Accordingly, the corresponding components are specially manufactured to order, and this causes the manufacturing cost to increase.

As illustrated in FIGS. 4A and 4B, if moment is applied to both end parts of the upper connection member 20 having a regular sectional area due to the load (indicated by arrows) being transferred to the fixing pins 16 and 17 through the boom 5 during working, the same moment is applied to the welded end parts of the upper connection member 20 and the center base metal part thereof in a length direction.

In this case, since the both end parts of the upper connection member 20 are vertically welded onto the side plates 14 and 15, stress is concentrated upon the end parts which are weak in structural strength. Also, since the both end parts of the upper connection member 20 are welded parts, they are weak in fatigue strength in comparison to the center part in the length direction (e.g., the fatigue strength of the welded part amounts to about 30% of the fatigue strength of the base metal part).

Accordingly, an unnecessary margin in structural strength is generated in the center part in the length direction of the upper connection member 20.

Although not illustrated in the drawings, since the same problem occurs when moment is applied to both end parts of the lower connection member 21 due to the load being transferred to the fixing pins 16 and 17 through the boom 5 during working, the detailed description thereof will be omitted.

SUMMARY OF THE INVENTION

Accordingly, the present invention has been made to solve the above-mentioned problems occurring in the prior art while advantages achieved by the prior art are maintained intact.

An embodiment of the present invention relates to an upper frame for construction equipment, which can improve the reliability on the quality of welded parts by welding a plate-shaped joint connection plate between left and right side plates to which fixing pins for supporting a boom and a boom cylinder are coupled.

An embodiment of the present invention relates to an upper frame for construction equipment, which can secure a safe rigidity and flexibility required for a working device by changing the thickness of a joint connection plate in the case where the power of the working device is increased in accordance with a user's demand when a new model of the construction equipment is developed.

An embodiment of the present invention relates to an upper frame for construction equipment, which can optimize the shape of welded end parts (i.e. parts welded to side plates) by a plate-shaped joint connection plate that can be easily supplied and demanded, supplement the fatigue strength by increasing the sectional area, and reduce the manufacturing cost and the weight of the construction equipment by cutting off a center part that is unnecessary in structural strength.

In one embodiment of the present invention, there is provided an upper frame for construction equipment mounted to swing on a lower driving structure and provided with a working device fixed thereto, which includes a base plate on which a driving means for swing the upper frame is mounted; left and right side plates vertically welded on the base plate to face each other and composed of inner and outer vertical plates to which a boom and a boom cylinder are rotatably fixed by fixing pins, respectively; and a joint connection plate having both sides welded on inner sides of the inner vertical plates and a lower end part welded on the base plate, and supporting the left and right side plates by exhibiting rigidity and flexibility when reaction load from the boom is generated on the fixing pins due to load generated on the working device during working.

In a preferred embodiment of the present invention, the joint connection plate is formed in a unit body and is welded on the base plate and the inner vertical plates.

At least one bent part may be formed on the joint connection part.

The joint connection plate may be composed of a lower joint connection plate welded on the base plate and the inner vertical plates, and an upper joint connection plate welded on the inner vertical plates.

At least one bent part may be formed on at least either of the lower joint connection plate and the upper joint connection plate.

A cut part is formed in the center of an upper end part of the joint connection plate.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
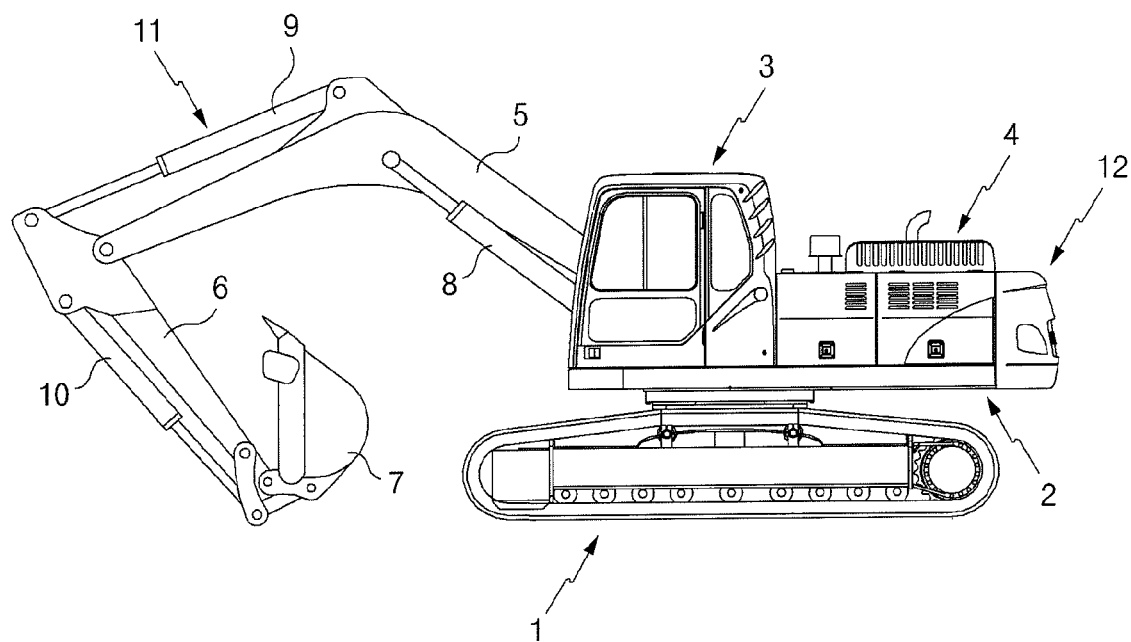
FIG. 1 is a schematic view illustrating a general tracked excavator.
Figure 2:
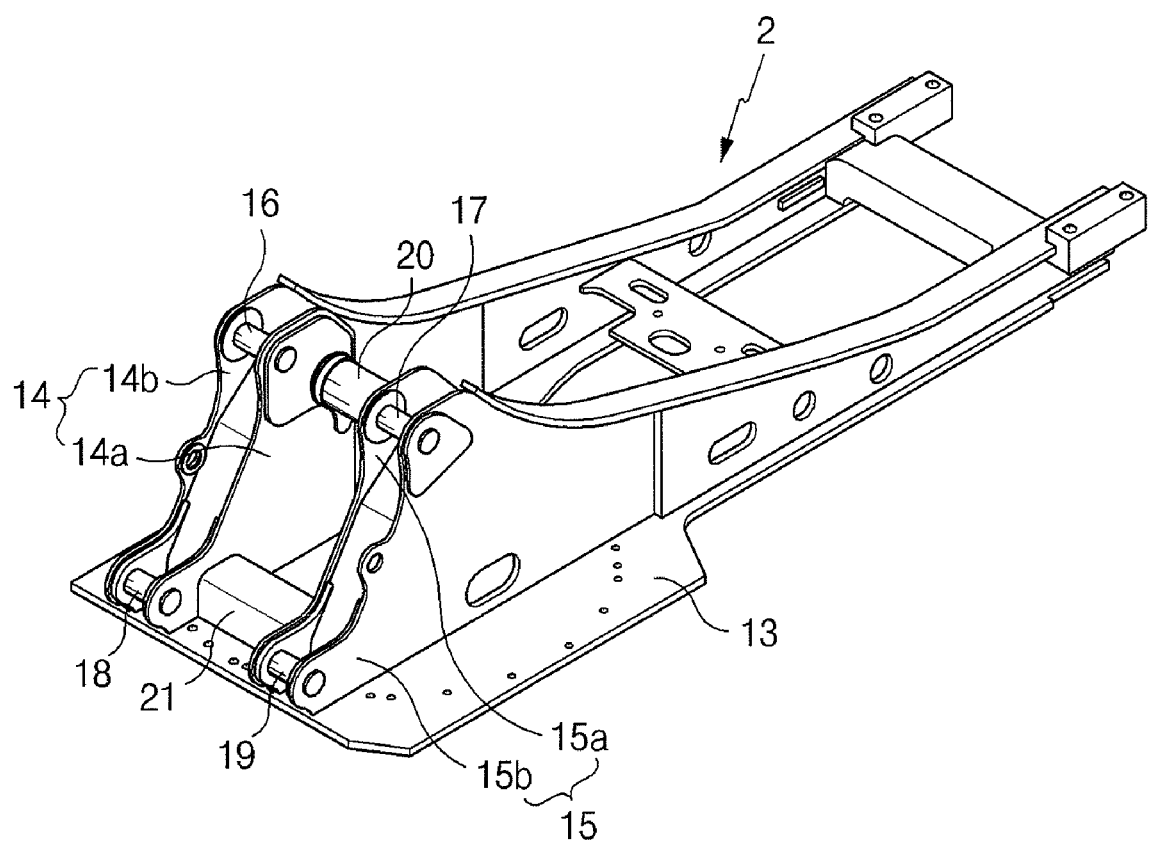
FIG. 2 is a view illustrating a main part of a conventional upper frame for construction equipment.
Figure 3:
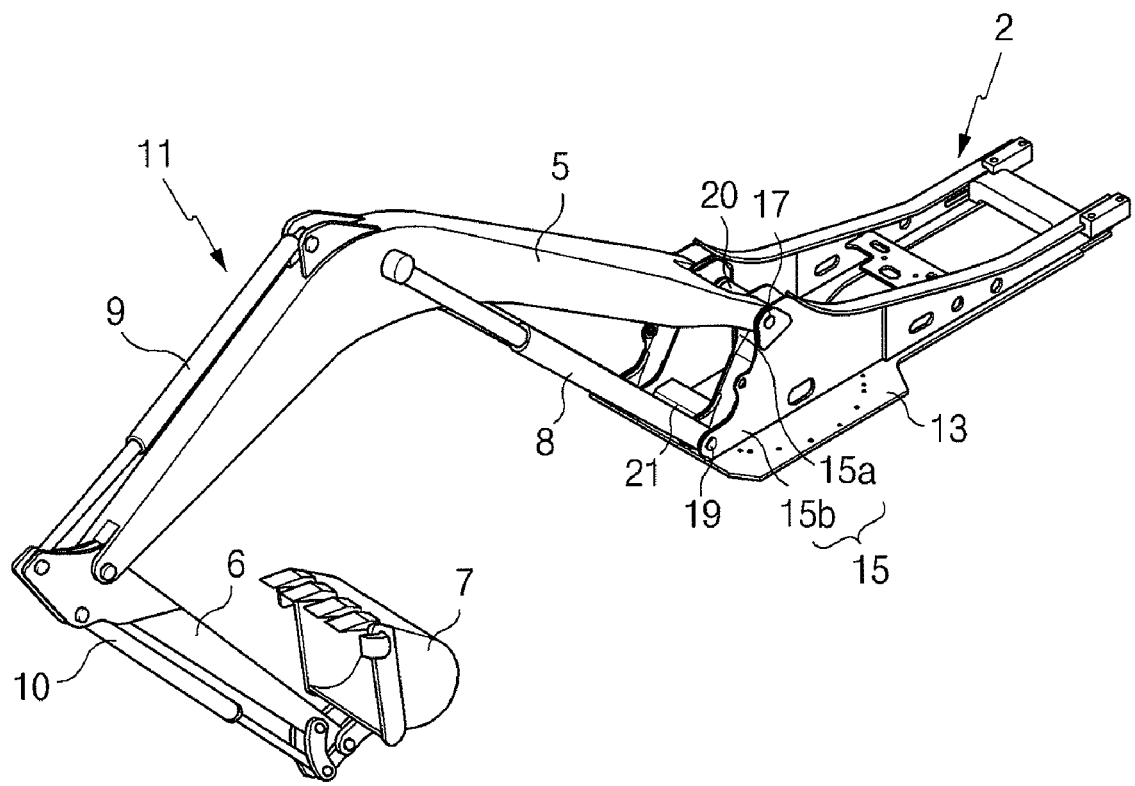
FIG. 3 is a view illustrating a conventional upper frame for construction equipment in a used state.
Figure 4A:
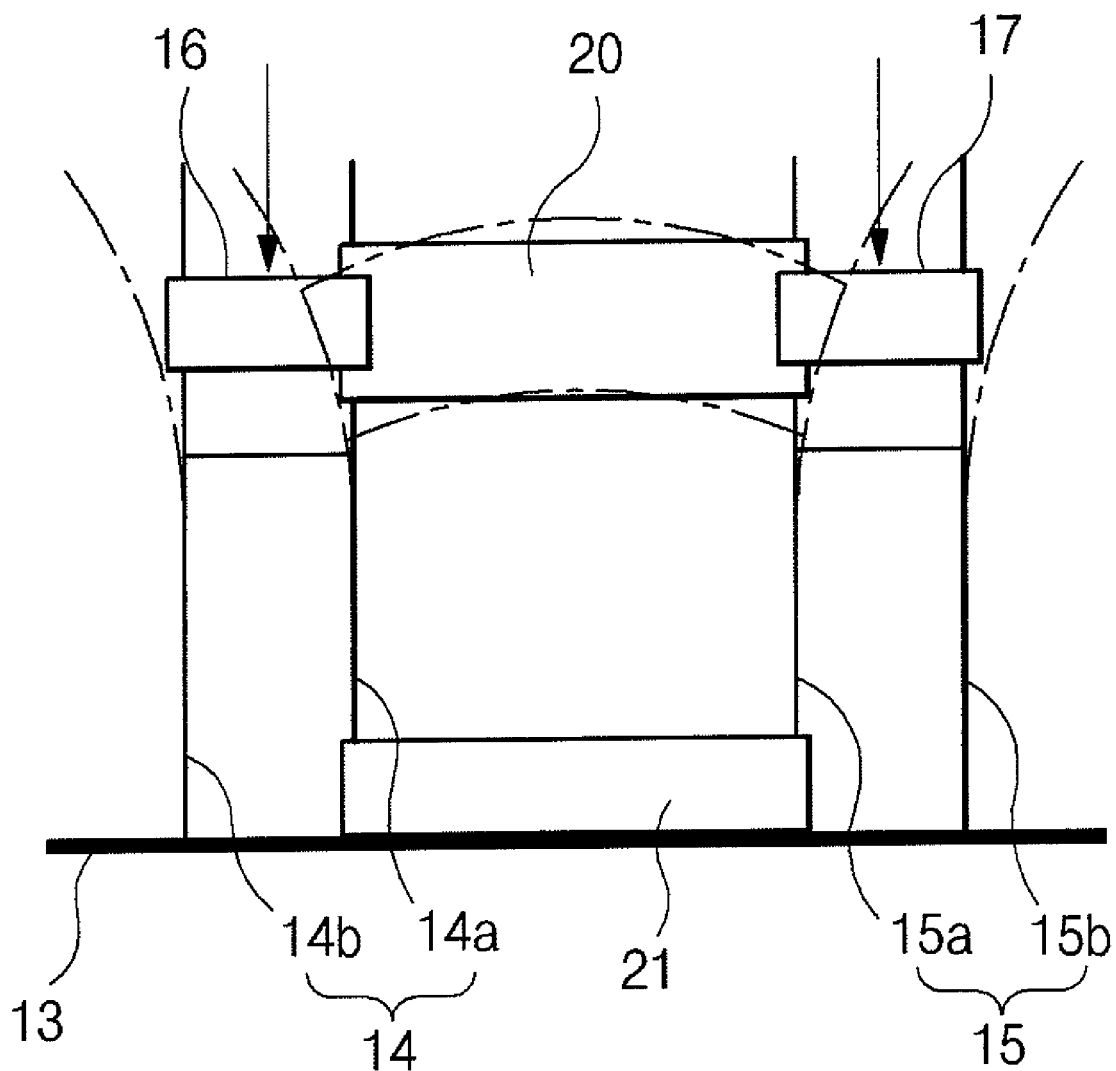
FIGS. 4A and 4B are views explaining that moment is generated on an upper connection member when reaction load from a boom is generated on fixing pins due to load generated on the boom in a conventional upper frame for construction equipment.
Figure 4B:
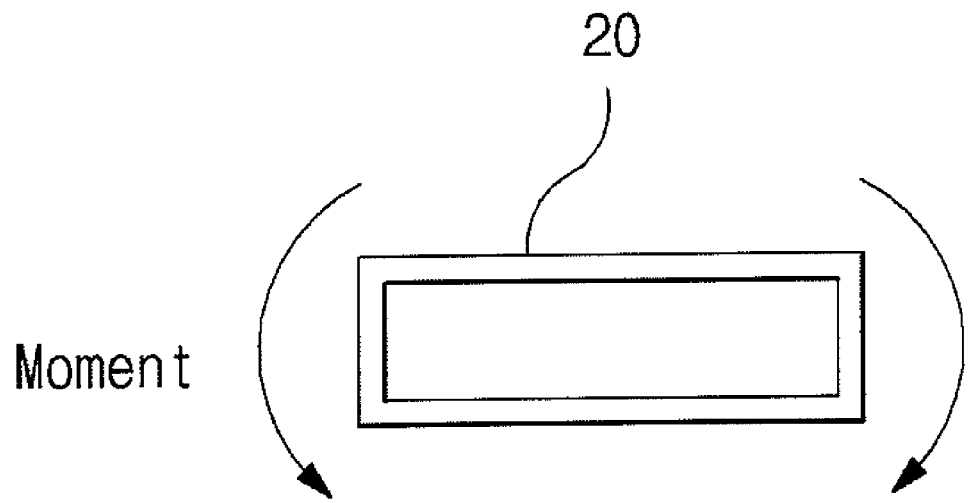
Figure 4B:
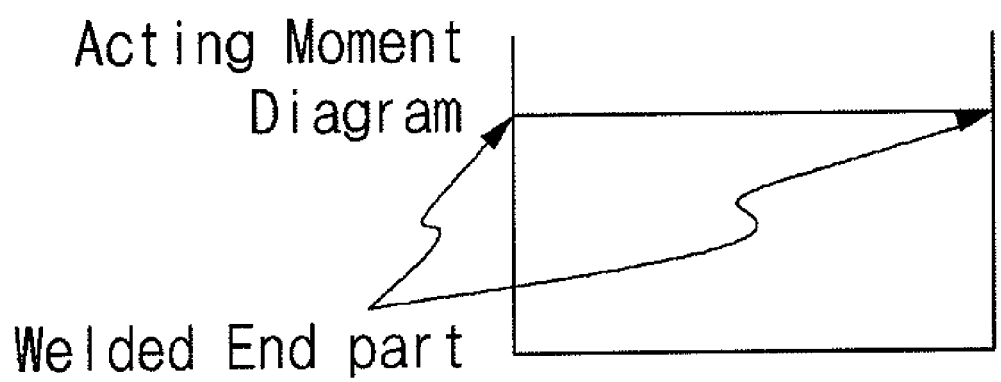
Figure 5:
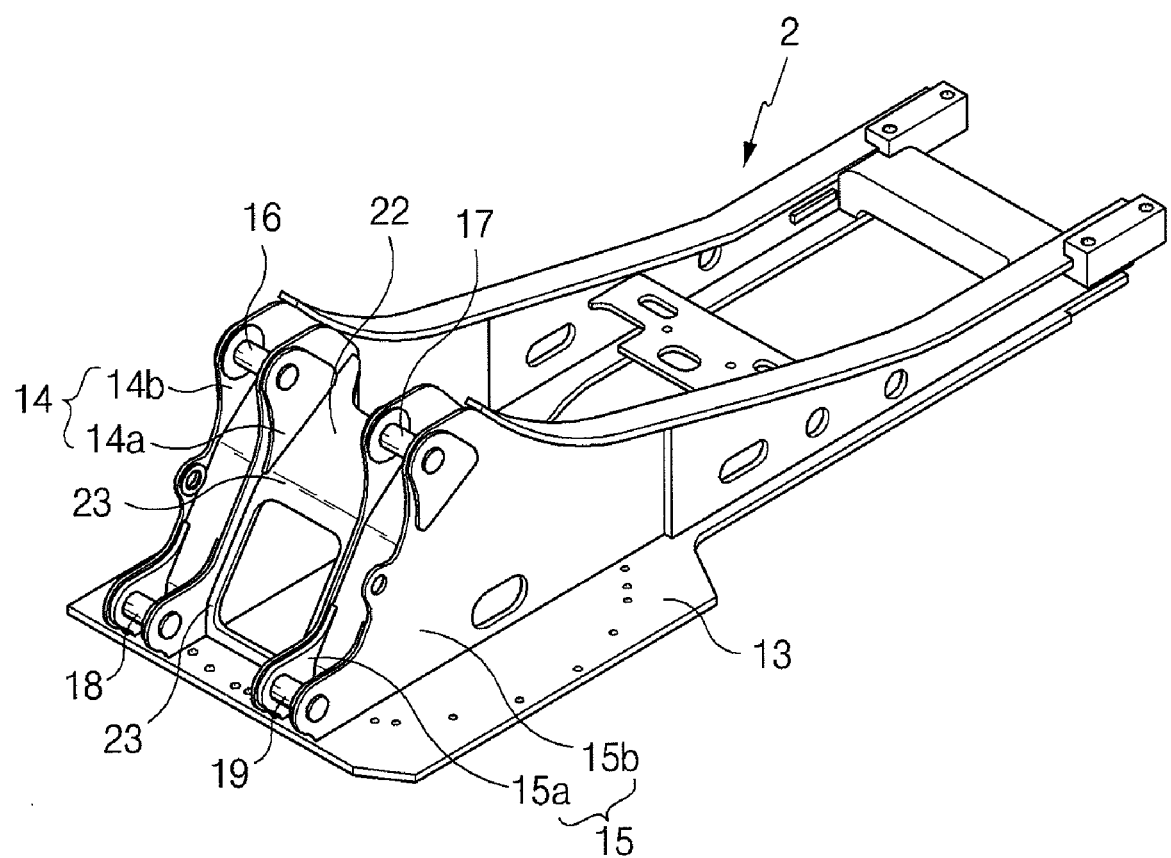
FIG. 5 is a schematic view illustrating an upper frame for construction equipment according to an embodiment of the present invention.
Figure 6:
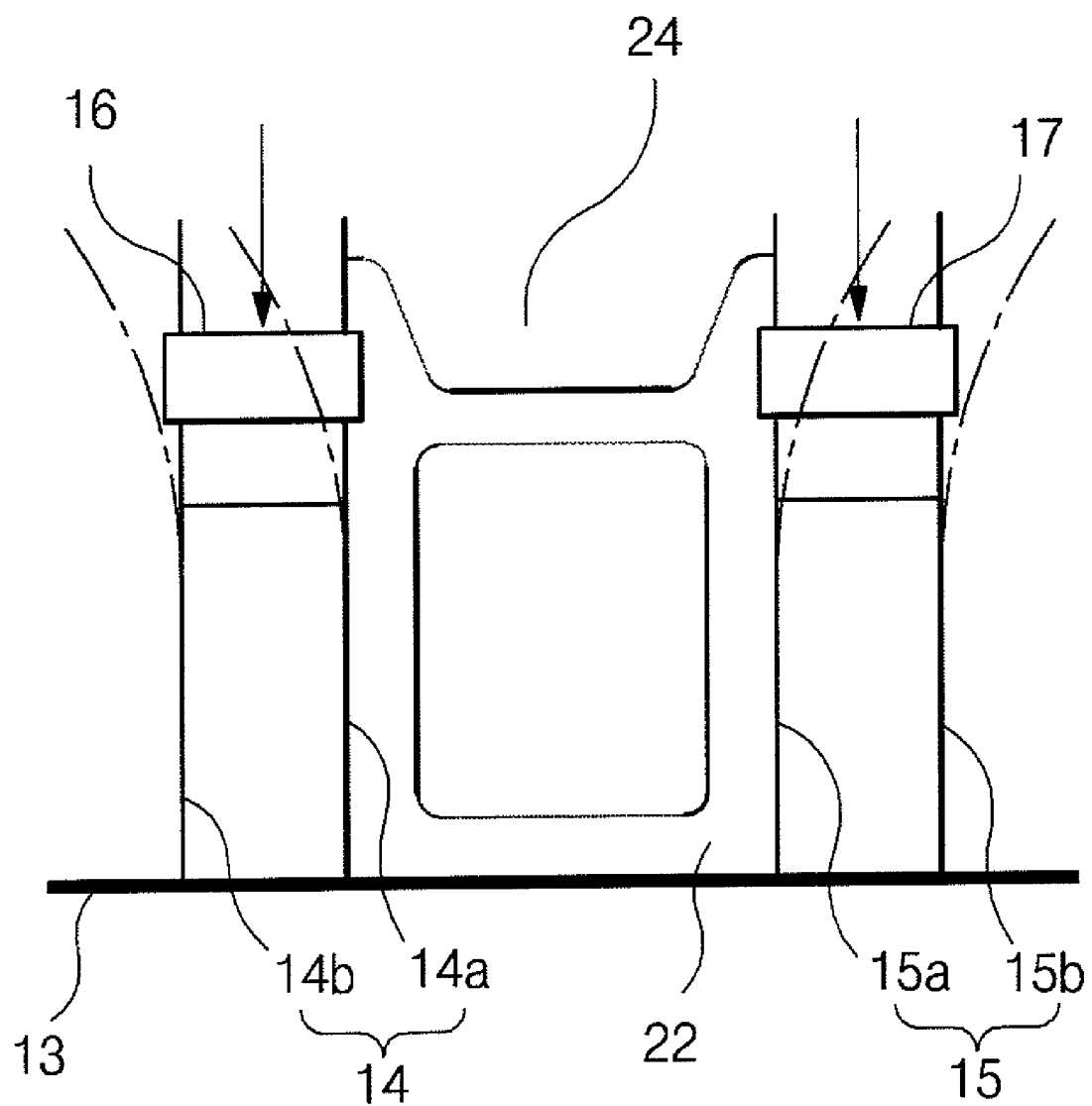
FIG. 6 is a view explaining that left and right side plates are supported by a joint connection plate when reaction load from a boom is generated on fixing pins due to load generated on the boom in an upper frame for construction equipment according to an embodiment of the present invention.
Figure 7:
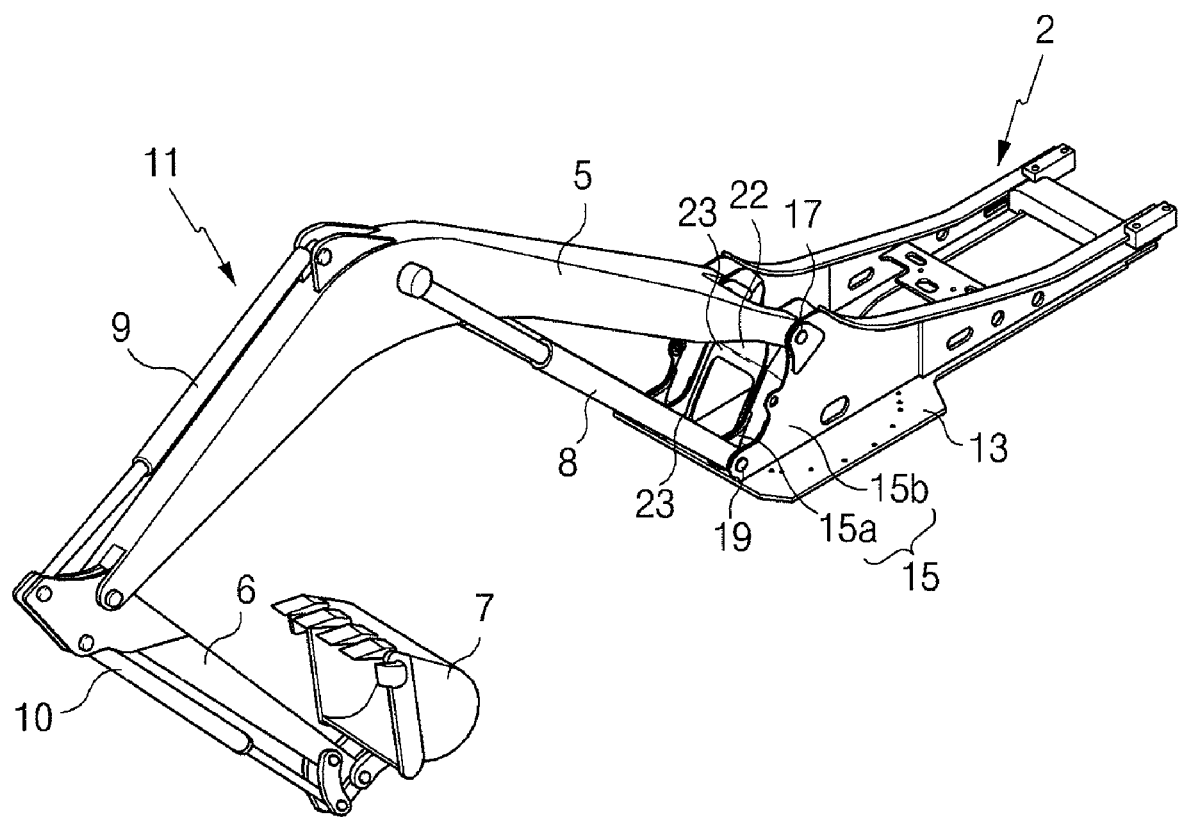
FIG. 7 is a schematic view illustrating an upper frame for construction equipment according to an embodiment of the present invention.

As illustrated in FIGS. 5, 6, and 7, an upper frame for construction equipment mounted to swing on a lower driving structure and provided with a working device rotatably fixed thereto according to an embodiment of the present invention includes a base plate 13 on which a driving means (e.g. a swing ring gear, a swing motor, and the like) for swing the upper frame 2 is mounted; left and right side plates 14 and 15 vertically welded on the base plate 13 to face each other and composed of inner and outer vertical plates 14a and 15a, and 14b and 15b to which a boom 5 and a boom cylinder 8 are rotatably fixed by fixing pins 16 and 17, and 18 and 19, respectively; and a joint connection plate 22 having both sides welded on inner sides of the inner vertical plates 14a and 15a and a lower end part welded on the base plate 13, and supporting the left and right side plates 14 and 15 by exhibiting rigidity and flexibility when reaction load from the boom 5 is generated on the fixing pins 16 and 17 due to load generated on the working device during working.

The joint connection plate 22 is formed in a unit body and is welded on the base plate 13 and the inner vertical plates 14a and 15a.

At least one bent part 23 is formed on the joint connection part 22.

A cut part 24 is formed in the center of an upper end part of the joint connection plate 22.

The construction, except for the joint connection plate 22 welded on the inner sides of the inner vertical plates 14a and 15a and on the upper side of the base plate 13 to support the left and right side plates 14 and 15 when the reaction load from the boom 5 is generated on the fixing pins 16 and 17 due to the load generated on the boom 5 during working, is substantially the same as the construction of the conventional upper frame for construction equipment, the detailed description thereof will be omitted. In the following description of the present invention, the same drawing reference numerals are used for the same elements across various figures.

As illustrated in FIGS. 5, 6, and 7, the both sides of the joint connection plate 22 are welded on the inner sides of the left and right side plates (i.e. the inner sides of the inner vertical plates 14a and 15a) to which the boom 5 and the boom cylinder 8 are rotatably fixed by the fixing pins 16 and 17, and 18 and 19, respectively. Also, the lower end parts of the joint connection plate 22 (i.e. three sides of the joint connection plate 22) are welded on the upper part of the base plate 13.

In this case, by at least one bent part 23 formed on the joint connection plate 22, the fixing position of the joint connection plate 22 welded on the inner vertical plates 14a and 15a can be optimized.

As described above, by welding the plate-shaped joint connection plate 22 onto the left and right side plates 14 and 15, the reliability of the quality of the welded parts is improved.

Also, in the case where the power of the working device such as the boom is increased in accordance with a customer's demand when a new model of the construction equipment is developed, a safe rigidity and flexibility required for a working device can be secured by increasing the sectional area through the change of the thickness of the joint connection plate 22. Accordingly, it is not required to specially manufacture the corresponding components to order.

Also, in the case where the load generated during working is transferred to the fixing pins 16 and 17 through the boom 5 (as indicated by arrows in FIG. 6), the fatigue strength can be supplemented by increasing the sectional area of the plate-shaped joint connection plate 22 that can be easily supplied and demanded or optimizing the shape of the welded parts.

In this case, by forming the cut part 24 through cutting-off of the center of the upper end part of the joint connection plate 22, which is unnecessary in structural strength, the manufacturing cost and the weight of the construction equipment can be reduced.

Figure 8:
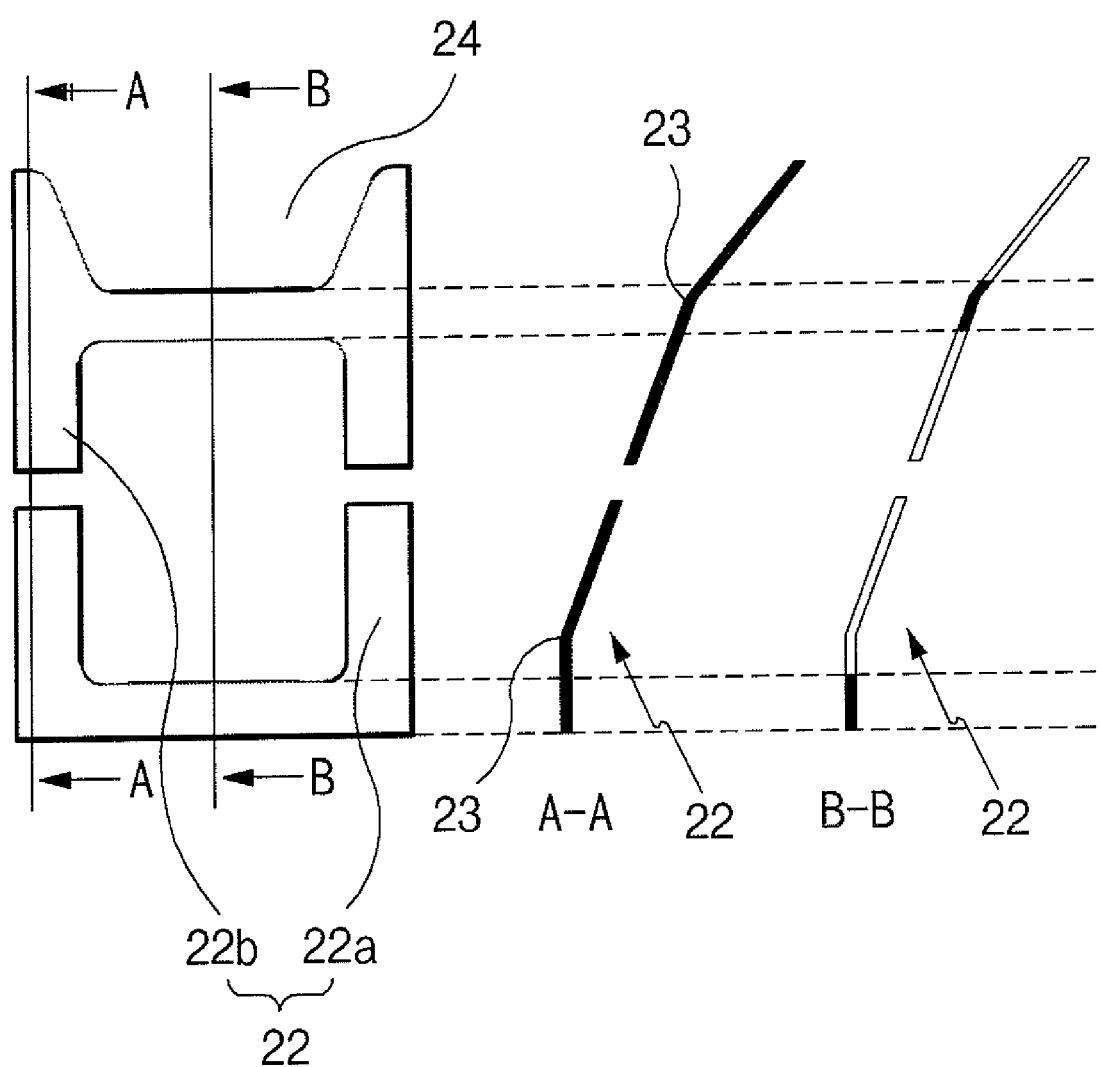
FIG. 8 shows a plan view illustrating a joint connection plate welded on left and right side plates and sectional views taken along lines A-A and B-B in an upper frame for construction equipment according to another embodiment of the present invention.

As illustrated in FIG. 8, according to an upper frame for construction equipment of another embodiment of the present invention, the joint connection plate 22 is divided into a lower joint connection plate 22a welded on the base plate 13 and the inner vertical plates 14a and 15a, and an upper joint connection plate 22b welded on the inner vertical plates 14a and 15a, as shown in FIGS. 5, 6 and 7. In this case, at least one bent part 23 is formed on at least either of the lower joint connection plate 22a and the upper joint connection plate 22b of the joint connection plate 22.

As described above, by dividedly forming the lower joint connection plate 22a and the upper joint connection plate 22b, the welding position of the joint connection plate 22 on the inner vertical plates 14a and 15a (as shown in FIGS. 6 and 7) can be optimized, and the workability in manufacturing the joint connection plate 22 can be improved.

In this case, since the construction, except for the joint connection plate 22 on which the bent parts 23 are formed and which is divided into the lower joint connection plate 22a and the upper joint connection plate 22b, is substantially the same as the construction of the upper frame for construction equipment according to an embodiment of the present invention, the detailed description thereof will be omitted. The same drawing reference numerals are used for the same elements across various figures.

As described above, the upper frame for construction equipment according to the embodiments of the present invention has the following advantages.

The reliability on the quality of the welded parts can be improved by welding the plate-shaped joint connection plate between the left and right side plates to which fixing pins for rotatably supporting the boom and the boom cylinder are coupled.

Also, in the case where the power of the working device is increased in accordance with a user's demand when a new model of the construction equipment is developed, a safe rigidity and flexibility required for the working device can be secured by changing the thickness of the joint connection plate. Accordingly, it is not required to specially manufacture the corresponding components to order, and thus the manufacturing cost of the construction equipment can be reduced.

Also, the shape of the welding member can be optimized by the plate-shaped joint connection plate that can be easily supplied and demanded, the fatigue strength can be supplemented by increasing the sectional area, and the manufacturing cost and the weight of the construction equipment can be reduced by cutting off the center part that is unnecessary in structural strength.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An upper frame for construction equipment mounted to swing on a lower driving structure and provided with a working device fixed thereto, comprising:
    a base plate on which driving means for swinging the upper frame is mounted;
    left and right side plates vertically welded on the base plate to face each other and composed of inner and outer vertical plates to which a boom and a boom cylinder are rotatably fixed by fixing pins, respectively; and
    a joint connection plate having both sides welded on inner sides of the inner vertical plates and a lower end part welded on the base plate, and supporting the left and right side plates by exhibiting rigidity and flexibility when reaction load from the boom is generated on the fixing pins due to load generated on the working device during working,
    wherein the joint connection slate is composed of a lower joint connection plate welded on the base plate and the inner vertical plates, and an upper joint connection plate welded on the inner vertical plates.

2. The upper frame of claim 1, wherein the joint connection plate is formed in a unit body and is welded on the base plate and the inner vertical plates.

3. The upper frame of claim 2, wherein at least one bent part is formed on the joint connection part.

4. The upper frame of claim 1, wherein at least one bent part is formed on at least either of the lower joint connection plate and the upper joint connection plate.

5. The upper frame of claim 1, wherein a cut part is formed in the center of an upper end part of the joint connection plate.

6. An upper frame for construction equipment mounted to swing on a lower driving structure and provided with a working device fixed thereto, comprising:
    a base plate on which driving means for swinging the upper frame is mounted;
    left and right side plates vertically welded on the base plate to face each other and composed of inner and outer vertical plates to which a boom and a boom cylinder are rotatably fixed by fixing pins, respectively; and
    a joint connection plate having both sides welded on inner sides of the inner vertical plates and a lower end part welded on the base plate, and supporting the left and right side plates by exhibiting rigidity and flexibility when reaction load from the boom is generated on the fixing pins due to load generated on the working device during working,
    wherein a cut part is formed in the center of an upper end part of the joint connection plate.

* * * * *